Oct. 20, 1936.     S. JENCICK     2,057,897
CONNECTING ROD
Filed Feb. 5, 1934
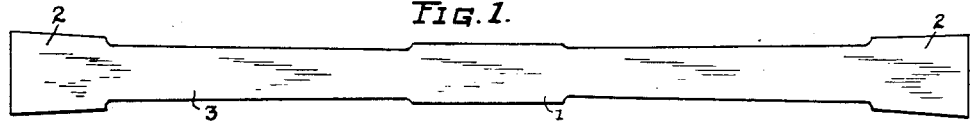
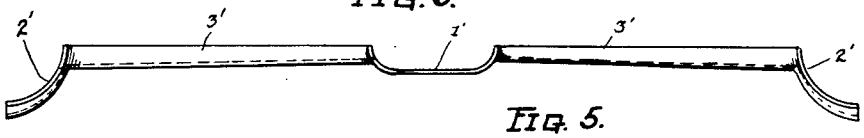
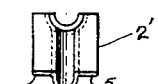
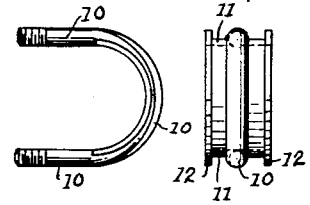
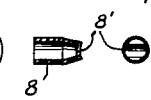
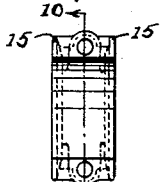
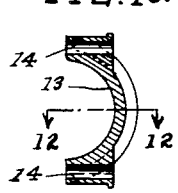
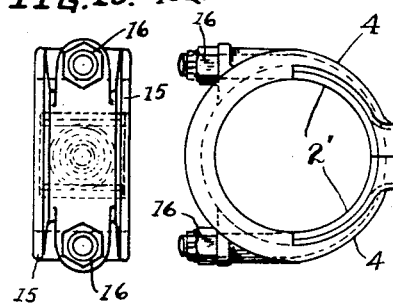
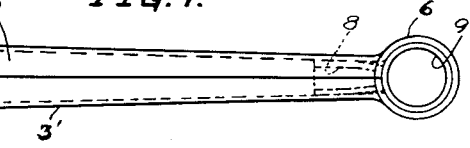
INVENTOR
STEPHEN JENCICK.
BY Milburn and Milburn
ATTORNEYS.

Patented Oct. 20, 1936

2,057,897

UNITED STATES PATENT OFFICE 2,057,897

CONNECTING ROD

Stephen Jencick, Chagrin Falls, Ohio

Application February 5, 1934, Serial No. 709,735

6 Claims. (Cl. 74—588)

This invention relates to the art of connecting rods for internal combustion engines and the method of making the same.

Heretofore, connecting rods have been made as forgings and have thus entailed comparatively great cost as will be more fully and clearly understood in view of the following description of the present invention.

The object of this invention, therefore, is to devise a connecting rod which can be manufactured in such manner as to considerably reduce the cost thereof but which at the same time possesses all of the necessary and desirable characteristics for use in an internal combustion engine.

More specifically, the object of the present invention is to devise a connecting rod in which the shank portion thereof is of hollow, tubular, sheet metal form and in which efficient bearing means are provided in the two ends thereof.

As another object of the present invention, there is herein contemplated a comparatively simple and inexpensive method of forming the hollow shank portion from a strip of sheet metal, and an efficient manner of embodying bearing portions at the two ends of the connecting rod.

Another specific object consists in devising a novel and efficient form of bearing at that end of the connecting rod which is connected to the crank shaft.

My invention contemplates also the provision of a reinforcing means for the hollow shaft portion, particularly at that end of the connecting rod which is connected to the piston.

Other objects will appear from the following description and claims when considered together with the accompanying drawing.

Fig. 1 is a plan view of the original blank of sheet metal;

Fig. 2 is an edge view of the same;

Fig. 3 is an elevation of the blank strip after it has been pressed into form;

Fig. 4 is a plan view of the same;

Fig. 5 is an end view thereof;

Fig. 6 shows the blank of Fig. 5 after it has been folded or bent into finished form;

Fig. 7 is a similar view with the bearing members applied to the two ends of the connecting rod and a reinforcing thimble applied to one end thereof;

Fig. 8 is a side view of a bearing member;

Fig. 9 is an end view thereof;

Fig. 10 is a sectional view of the companion bearing member;

Fig. 11 is an end view thereof;

Fig. 12 is a side view thereof;

Fig. 13 is an end elevation of the larger end of the completely assembled connecting rod;

Fig. 14 is a longitudinal sectional view of the reinforcing thimble; and

Fig. 15 is an end elevation thereof.

It is to be understood that the present disclosure is merely for purposes of illustration and that other modifications may be made without departing from the spirit of the present invention as herein set forth and claimed.

In carrying out the method contemplated by the present invention, a strip of sheet metal of suitable gauge is first stamped out into the form indicated by Fig. 1 of the drawing. As indicated in Fig. 1, the two end halves of this strip of sheet metal are of substantially duplicate form. In a general way, this sheet metal strip might be considered as having an enlarged portion 1 in the middle thereof and enlarged portions 2 at the ends thereof, these enlarged portions being connected by the intermediate tapering shank portions 3 which are of less width than the middle and end portions.

The sheet metal strip indicated in Fig. 1, is then pressed into the form indicated in Fig. 2 in which the shank portions 3 are given a substantially semi-cylindrical form indicated by reference numeral 3' while the middle portion 1 is given a substantially bowed form indicated by reference numeral 1', and the two end portions 2 are each given the form of what might be considered a quadrant 2'. Each quadrant 2' is formed with a middle groove 4 between the flat portions 5. It will be observed that because of the slight taper of the sheet metal strip, the half tubular shank portions 3' are also of slightly tapering form in the same direction, as indicated in Fig. 3.

The sheet metal blank, after having been given the form indicated in Fig. 3, is then folded upon itself about its middle transverse axis so as to cause the two halves thereof to overlie each other, as clearly indicated in Fig. 6 of the drawing. In this way, the two shank portions 3' are brought together with their edges in abutting engagement with each other for welding so as to form a tapering tubular or hollow shank. At the same time and by the same bending or folding operation, the middle portion 1' is closed into a circular bearing portion of cylindrical form open at its two ends, the axis of this bearing portion 6 extending in a direction transversely of the longitudinal axis of the shank portion. At the same time and by the same operation, the two quadrant end portions 2' are brought together so as to supplement each other in the formation of a substantially semi-circular end portion in which the grooves 4 occupy continuous or registering relation. The end portion is then adapted to have attached thereto a bearing means to serve as a means of connection with the crank shaft.

As a means of reinforcing the smaller end of the hollow tubular shank portion, I have provided the thimble insert 8 which may be in the form of a forging with its one end closed and having a cylindrical curvature corresponding to that of the inner surface of the bearing bushing 9. The closed end of the member 8 is indicated by reference numeral 8'. As indicated in the drawing, the reinforcing thimble 8 is of generally tapering form so as to fit snugly within the hollow shank portion and can be welded thereto. As indicated in Figs. 7 and 14, the smaller end portion of thimble 8 is still further tapered, thereby still further increasing the reinforcement at this point.

The bearing means provided in the larger end of the connecting rod comprises a member which is welded to the inner surface of the semi-circular bearing portion and comprises also a readily detachable companion bearing member for engagement therewith. That portion of the bearing member which is welded to the bearing portion is of a suitable solid metal form as for instance a forging which has what might be considered a bolt portion 10 adapted for seating engagement within the substantially semi-circular groove 4 in the bearing portion for permanent welding connection therewith. The bolt portion 10 has two threaded end portions projecting beyond the main body of the forging, these threaded end portions being adapted for engagement by the companion bearing member, as will be explained. Adjacent the curved part of the bolt portion 10, the forging has the curved flat portions 11 which are adapted for seating engagement upon the correspondingly curved flat portions 5 of the semi-circular bearing portion. The side marginal portions of the middle or curved part of this forging are in the form of flanges 12.

The companion bearing member is also in the form of a forging and comprises the substantially semi-circular bowed portion 13 with the bolt-holes 14 extending through the sides thereof to receive the projecting threaded end portions of the bolt 10. This forging also has its side marginal portions flanged, as indicated by reference numeral 15, in substantial continuation of the flange portions 12.

With the first bearing member placed in position within the bearing portion and the engaging surfaces thereof welded together, the companion bearing member is placed in position so as to complete the cylindrical bearing opening and at the same time engage the bolt holes 14 over the projecting threaded ends of the bolt 10, whereupon the nuts 16 are applied thereto.

Thus, I have devised a connecting rod in which there is obtained the proper form of bearings for efficient connection and operation, while at the same time the shank portion of the connecting rod may be formed in a less costly manner and without sacrificing any rigidity or strength required. In other words, with my particular method and construction, I am enabled to selectively adopt one form of structure at the larger bearing end of the connecting rod and to adopt a less expensive and yet efficient form of structure throughout the shank portion thereof.

By virtue of the hollow tubular form, the shank portion possesses considerable strength which is amply sufficient to withstand the thrust which is exerted therealong during normal operation. In this way, there is obtained all of the necessary rigidity and strength desired for the purpose intended and there is eliminated the necessity of solid form of metal which has heretofore been employed throughout the entire extent of the shank portion and which obviously involves additional weight and cost.

Furthermore, the method of making my improved connectnig rod is comparatively simple and can be carried out in such a manner that the finished product as herein contemplated can be manufactured and sold at a substantial saving in cost to the ultimate consumer.

What I claim is:

1. A connecting rod comprising semi-tubular members welded longitudinally into a tubular sheet metal shank portion provided with an integral bearing portion at the one end thereof, said shank portion having an integral substantially semi-circular bearing portion at the other end thereof with a groove provided therein, said groove extending in a plane transverse of that of said longitudinal welded seam, a forged bearing member having a substantially U-shaped bolt member welded in said groove, a companion substantially semi-circular forged bearing member having apertures to receive the end portions of said bolt member, and means for detachably securing said companion bearing member in assembly therewith.

2. A connecting rod comprising a tubular sheet metal shank portion provided with a bearing portion at one end thereof and a substantially semi-circular bearing portion at the other end thereof with a groove provided therein, a bearing member having a substantially U-shaped bolt member welded in said groove, a companion substantially semi-circular bearing member having apertures to receive the end portions of said bolt member, and means for detachably securing said companion bearing member in assembly therewith.

3. A connecting rod comprising a tubular tapered sheet metal shank portion provided with a bearing portion at the smaller end thereof, reinforcing means tapered so as to fit within the smaller end of said shank portion and being located adjacent said bearing portion, said reinforcing means having its smaller end concaved in accordance with the curvature of said bearing portion, the other end of said shank portion being provided with a substantially semi-circular bearing portion having a medially disposed groove in the inner face and extending throughout the extent thereof, a bearing member having a substantially U-shaped bolt member welded in said groove, a companion substantially semi-circular bearing member having apertures to receive the ends of said bolt member, and means for detachably securing said companion bearing member in assembly therewith.

4. A connecting rod comprising semi-tubular members welded longitudinally into a tubular sheet metal shank portion provided with an integral bearing portion at the one end thereof, said shank portion having an integral substantially semi-circular bearing portion at the other end thereof with a groove provided therein, said groove extending in a plane transverse of that of said longitudinal welded seam, a forged bearing member having a substantially U-shaped member welded in said groove, a companion substantially semi-circular forged bearing member having apertures for bolts to secure the same to said U-shaped member, and bolts for detachably securing said companion bearing member in assembly therewith.

5. A connecting rod comprising a tubular sheet metal shank portion provided with a bearing portion at one end thereof and a substantially semi-circular bearing portion at the other end thereof with a groove provided therein, a bearing member having a substantially U-shaped member welded in said groove, a companion substantially semi-circular bearing member having apertures for bolts to secure the same to said U-shaped member and bolts for detachably securing said companion bearing member in assembly therewith.

6. A connecting rod comprising a tubular tapered sheet metal shank portion provided with a bearing portion at the smaller end thereof, reinforcing means tapered so as to fit within the smaller end of said shank portion and being located adjacent said bearing portion, said reinforcing means having its smaller end concaved in accordance with the curvature of said bearing portion, the other end of said shank portion being provided with a substantially semi-circular bearing portion having a medially disposed groove in the inner face and extending throughout the extent thereof, a bearing member having a substantially U-shaped member welded in said groove, a companion substantially semi-circular bearing member having apertures for bolts to secure the same to said U-shaped member, and bolts for detachably securing said companion bearing member in assembly therewith.

STEPHEN JENCICK.